(12) United States Patent
Harris

(10) Patent No.: US 8,014,402 B2
(45) Date of Patent: Sep. 6, 2011

(54) METHODS AND APPARATUS FOR USE IN FORWARDING SHORT MESSAGES FOR MOBILE COMMUNICATION DEVICES

(75) Inventor: Ian Harris, Devizes (GB)

(73) Assignee: Research In Motion Limited, Waterloo, Ontario (CA)

( * ) Notice: Subject to any disclaimer, the term of this patent is extended or adjusted under 35 U.S.C. 154(b) by 917 days.

(21) Appl. No.: 11/931,173

(22) Filed: Oct. 31, 2007

(65) Prior Publication Data
US 2008/0200192 A1    Aug. 21, 2008

Related U.S. Application Data

(60) Provisional application No. 60/863,896, filed on Nov. 1, 2006.

(51) Int. Cl.
*H04L 12/28* (2006.01)
(52) U.S. Cl. .................. 370/392; 370/310; 370/496
(58) Field of Classification Search .............. 370/313, 370/392, 496, 310
See application file for complete search history.

(56) References Cited

U.S. PATENT DOCUMENTS

| | | | |
|---|---|---|---|
| 5,493,692 A | 2/1996 | Theimer et al. | |
| 5,878,397 A * | 3/1999 | Stille et al. | 455/466 |
| 6,208,870 B1 * | 3/2001 | Lorello et al. | 455/466 |
| 6,748,229 B1 * | 6/2004 | Calatrava-Requena et al. | 455/466 |
| 6,957,248 B2 | 10/2005 | Quine et al. | |
| 6,973,086 B2 * | 12/2005 | Patil et al. | 370/392 |
| 7,116,994 B2 * | 10/2006 | Hatch | 455/466 |
| 7,319,880 B2 | 1/2008 | Sin | |
| 7,502,339 B1 * | 3/2009 | Pirkola et al. | 370/310 |
| 7,577,431 B2 * | 8/2009 | Jiang | 455/432.1 |
| 2002/0137530 A1 | 9/2002 | Karve | |
| 2003/0181202 A1 | 9/2003 | Link, II et al. | |
| 2005/0036457 A1 | 2/2005 | Salin | |

(Continued)

FOREIGN PATENT DOCUMENTS
EP    1294201 A1    3/2003
(Continued)

OTHER PUBLICATIONS

International Search Report and Written Opinion, PCT Application No. CA2007/001946, Feb. 6, 2008.

(Continued)

*Primary Examiner* — Ricky Ngo
*Assistant Examiner* — Dewanda Samuel
(74) *Attorney, Agent, or Firm* — John J. Oskorep, Esq.

(57) ABSTRACT

In one illustrative example, when a message forwarding function is enabled for a mobile communication device which operates in a wireless communication network, an address (e.g. an MSISDN) of the mobile device is assigned to "virtual mobile equipment" in the wireless network. The equipment registers with the wireless network with respect to the address, and stores an association in memory between the address and an alternate address of an alternate communication device. Subsequently, the equipment receives a short message having a destination address that matches the address. In response, the equipment forwards the short message to the alternate address for delivery to the alternate device (e.g. a mobile or server) based on the stored association. When the message forwarding function is disabled for and/or by the mobile device, the address of the mobile device is deassigned from the equipment, so that the mobile device is again able to receive short messages having destination addresses that match the address.

40 Claims, 8 Drawing Sheets

U.S. PATENT DOCUMENTS

| | | |
|---|---|---|
| 2005/0114533 A1 | 5/2005 | Hullfish et al. |
| 2006/0046752 A1 | 3/2006 | Kalavade |
| 2006/0234690 A1 | 10/2006 | Itzkovitz et al. |
| 2007/0087766 A1 | 4/2007 | Hardy et al. |
| 2007/0223428 A1 | 9/2007 | Patterson et al. |
| 2008/0171549 A1 | 7/2008 | Hursey et al. |

FOREIGN PATENT DOCUMENTS

| | | | |
|---|---|---|---|
| EP | 1377086 | * | 1/2004 |
| EP | 1775971 A1 | | 4/2007 |
| EP | 1219125 B1 | | 7/2008 |
| WO | 0228129 A1 | | 4/2002 |
| WO | 2005114912 A1 | | 12/2005 |
| WO | 2006000113 A1 | | 1/2006 |
| WO | 2006105773 A2 | | 10/2006 |

OTHER PUBLICATIONS

International Preliminary Report on Patentability, PCT Application No. CA2007/001946, Feb. 4, 2009.

Extended European Search Report for EP Patent application #07816096.7, May 11, 2010.

* cited by examiner

METHODS AND APPARATUS FOR USE IN FORWARDING SHORT MESSAGES FOR MOBILE COMMUNICATION DEVICES

CROSS-REFERENCE TO RELATED APPLICATION

The present application is a non-provisional application which claims priority to provisional application entitled "Methods And Apparatus For Use In Forwarding Short Messages For Mobile Communication Devices" having application No. 60/863,896 and filing date 1 Nov. 2006.

BACKGROUND

1. Field of the Technology

The present disclosure relates generally to wireless communication networks and devices, and more particularly to Short Message Service (SMS) message delivery techniques within such networks.

2. Description of the Related Art

There are several different types of useful portable electronic devices on the market today. An end user may own two or more of these electronic devices, including a data communication device, a cellular telephone, a multiple-function communication device with data and voice communication capabilities, a personal digital assistant (PDA) enabled for wireless communication, or a computer incorporating an internal modem, as some examples.

Some of these devices are equipped to send and receive Short Message Service (SMS) messages. SMS messages are different from e-mail messages but are delivered in a similar fashion with use of a uniquely identifying address. For example, the address may be a Mobile Station Integrated International Service Digital Network (MSISDN) uniquely associated with a Subscriber Identity Module (SIM) that is inserted within a wireless communication device. Since each device is associated with a unique address, an end user who owns two or more of these devices often finds it inconvenient to continually make use of only one of the devices to keep a single consistent address or point of contact with others.

More specifically, the present disclosure is concerned with issues related to SMS enhancements such as Forwarding Short Messages and Storing Short Messages in the network. Note that such ideas have been debated in the past in standards groups including SMG4 and T2. At the time, it was concluded that it was too complex both technically and commercially.

The following discussion serves to highlight these problems. A mobile subscriber may receive SMS messages from any Short Message Service Center (SMS-SC) in any network operator's domain as well as their SMS-SC of the home public land mobile network (PLMN). If a mobile subscriber wishes to have their short messages forwarded to another MSISDN or any other destination address, then an agreement may be made with their home PLMN SMS-SC. That would work for any SMS messages that are to be delivered via the subscriber's home PLMN SMS-SC. However, this cannot easily work without highly complex agreements with any SMS messages that are to be delivered to that subscriber from any other SMS-SC in other PLMN domains. The consequence is that SMS forwarding would be ineffective unless the forwarding mechanism applied to every SMS-SC in every network operator's domain. Additionally, even if it were possible to have some commercial agreement, it is highly likely that such an agreement and SMS-SC capability in non-home PLMN SMS-SC's would have to be optional. This would make the Forwarding service useless as the recipient would still receive Short Messages to the unwanted destination.

Accordingly, there is a resulting need for improved methods and apparatus for use in delivering SMS messages to wireless communication devices.

BRIEF DESCRIPTION OF THE DRAWINGS

Embodiments of present invention will now be described by way of example with reference to attached figures, wherein.

DETAILED DESCRIPTION OF PREFERRED EMBODIMENTS

Methods and apparatus for use in forwarding short messages for mobile communication devices adapted to operate in wireless communication networks are described herein. In one illustrative example, when a message forwarding function is enabled for a mobile communication device which operates in a wireless communication network, an address (e.g. an MSISDN) of the mobile device is assigned to "virtual mobile equipment" in the wireless network. The equipment registers with the wireless network with respect to the address, and stores an association in memory between the address and an alternate address of an alternate communication device. Subsequently, the equipment receives a short message having a destination address that matches the address. When the message forwarding function is disabled for and/or by the mobile device, the address of the mobile device is deassigned from the equipment, where the equipment deregisters from the wireless network with respect to the address. Thereafter, the mobile device is again able to receive short messages having destination addresses that match the address.

Another illustrative technique utilized in the mobile communication device is for use in controlling the forwarding of short messages in the wireless communication network. The mobile communication device is associated with an address utilized to identify the mobile communication device in the wireless communication network. In The mobile device receives, via a user interface of the mobile communication device, a user input comprising a message forwarding enable instruction or message. In response to the receiving of the user input comprising the message forwarding enable instruction or message, the mobile communication device deregisters its location from the wireless communication network with respect to the address and causes a message forwarding enable message to be sent to equipment in the wireless communication network. This message forwarding enable message is defined to cause the equipment to register a location of the equipment in the wireless communication network with respect to the address, so that the equipment can receive and forward short messages addressed to the address to an alternate address which identifies an alternate communication device. The mobile device may also receive, via the user interface, a user input comprising a message forwarding disable instruction or message. In response to the receiving of the user input comprising the message forwarding disable instruction or message, the mobile communication device registers its location in the wireless communication network with respect to the address and causes a message forwarding disable message to be sent to the equipment in the wireless communication network. The message forwarding disable message is defined to cause the equipment to deregister its location from the wireless communication network with respect to the address.

Figure 1:
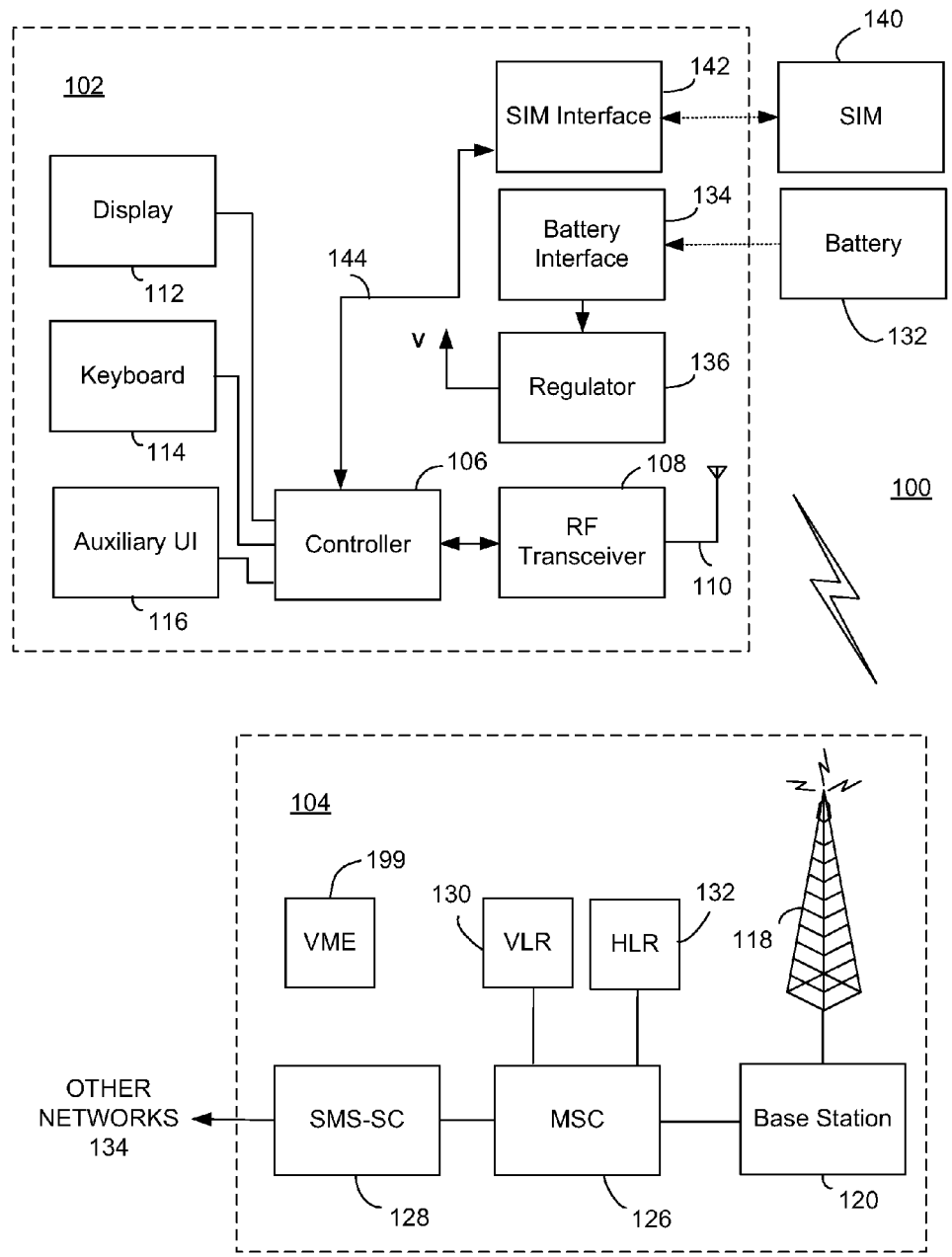
FIG. 1 is a block diagram of a communication system which includes a wireless communication device for communicating in a wireless communication network.

General Configuration. FIG. 1 is a block diagram of a communication system 100 which includes a wireless communication device 102 which communicates through a wireless communication network 104. Wireless communication device 102 preferably includes a visual display 112, a keyboard 114, and one or more auxiliary user interfaces (UI) 116, each of which is coupled to a controller 106. Controller 106 is also coupled to radio frequency (RF) transceiver circuitry 108 and an antenna 110.

In most modern communication devices, controller 106 is embodied as a central processing unit (CPU) which runs operating system software in a memory component (not shown). Controller 106 will normally control overall operation of wireless device 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in wireless device 102, information for transmission to network 104, a telephone number to place a telephone call, commands to be executed on wireless device 102, and possibly other or different user inputs.

Wireless device 102 sends communication signals to and receives communication signals from network 104 over a wireless link via antenna 110. RF transceiver circuitry 108 performs functions similar to those of base station 120, including for example modulation/demodulation and possibly encoding/decoding and encryption/decryption. It is also contemplated that RF transceiver circuitry 108 may perform certain functions in addition to those performed by base station 120. It will be apparent to those skilled in art that RF transceiver circuitry 108 will be adapted to particular wireless network or networks in which wireless device 102 is intended to operate.

Wireless device 102 includes a battery interface 134 for receiving one or more rechargeable batteries 132. Battery 132 provides electrical power to (most if not all) electrical circuitry in wireless device 102, and battery interface 132 provides for a mechanical and electrical connection for battery 132. Battery interface 132 is coupled to a regulator 136 which regulates power for the device. When wireless device 102 is fully operational, an RF transmitter of RF transceiver circuitry 108 is typically keyed or turned on only when it is sending to network, and is otherwise turned off to conserve resources. Such intermittent operation of transmitter has a dramatic effect on power consumption of wireless device 102. Similarly, an RF receiver of RF transceiver circuitry 108 is typically periodically turned off to conserve power until it is needed to receive signals or information (if at all) during designated time periods.

Wireless device 102 may consist of a single unit, such as a data communication device, a cellular telephone, a multiple-function communication device with data and voice communication capabilities such as a mobile telephone with data communication functionality, a personal digital assistant (PDA) enabled for wireless communication, or a computer incorporating an internal modem. Alternatively, wireless device 102 may be a multiple-module unit comprising a plurality of separate components, including but in no way limited to a computer or other device connected to a wireless modem. In particular, for example, in the wireless device block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a wireless device 102 may have a more particular implementation as described later in relation to wireless device 202 of FIG. 2.

Wireless device 102 operates using a Subscriber Identity Module (SIM) 140 which is connected to or inserted in wireless device 102 at a SIM interface 142. SIM 140 is one type of a conventional "smart card" used to identify an end user (or subscriber) of wireless device 102 and to personalize the device, among other things. Without SIM 140, the wireless device terminal is not fully operational for communication through wireless network 104. By inserting SIM 140 into wireless device 102, an end user can have access to any and all of his/her subscribed services. In order to identify the subscriber, SIM 140 contains some user parameters such as an International Mobile Subscriber Identity (IMSI) and a Mobile Station Integrated International Service Digital Network (MSISDN). In addition, SIM 140 is typically protected by a four-digit Personal Identification Number (PIN) which is stored therein and known only by the end user. An advantage of using SIM 140 is that end users are not necessarily bound by any single physical wireless device. Typically, the only element that personalizes a wireless device terminal is a SIM card. Therefore, the user can access subscribed services using any wireless device equipped to operate with the user's SIM.

Some information stored on SIM 140 (e.g. address book and SMS messages) may be retrieved and visually displayed on display 112. Wireless device 102 has one or more software applications which are executed by controller 144 to facilitate the information stored on SIM 140 to be displayed on display 112. Controller 144 and SIM interface 142 have data and control lines 144 coupled therebetween to facilitate the transfer of the information between controller 144 and SIM interface 142 so that it may be visually displayed. An end user enters user input signals at keyboard 114, for example, and in response, controller 144 controls SIM interface 142 and SIM 140 to retrieve the information for display. The end user may also enter user input signals at keyboard 114, for example, and, in response, controller 144 controls SIM interface 142 and SIM 140 to store information on SIM 140 for later retrieval and viewing. Preferably, the software applications executed by controller 106 include an application to retrieve and display address book information stored on SIM 140, and an application to retrieve and display SMS message information stored on SIM 140.

Wireless device 102 communicates in and through wireless communication network 104. In the embodiment of FIG. 1, wireless network 104 is a Global Systems for Mobile (GSM) and General Packet Radio Service (GPRS) network. Wireless network 104 includes a base station 120 with an associated antenna tower 118, a Mobile Switching Center (MSC) 126, a Visitor Location Register (VLR) 130, a Home Location Register (HLR) 132, and a Short Message Service Center (SMS-SC) 128. MSC 126 is coupled to base station 120 and to SMS-SC 128, which is in turn coupled to other network(s) 134.

Base station 120, including its associated controller and antenna tower 118, provides wireless network coverage for a particular coverage area commonly referred to as a "cell". Base station 120 transmits communication signals to and receives communication signals from wireless devices within its cell via antenna tower 118. Base station 120 normally performs such functions as modulation and possibly encoding and/or encryption of signals to be transmitted to the wireless device in accordance with particular, usually predetermined, communication protocols and parameters, under control of its controller. Base station 120 similarly demodulates and possibly decodes and decrypts, if necessary, any communication signals received from wireless device 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and wireless device 102. Those skilled in art will appreciate that a wireless network in actual practice may include hundreds of cells, each served by a distinct base station 120 and transceiver, depending upon desired overall expanse of network coverage. All base station controllers and base stations may be connected by multiple switches and routers (not shown), controlled by multiple network controllers.

For all wireless devices 102 registered with a network operator, permanent data (such as wireless device 102 user's profile) as well as temporary data (such as wireless device's 102 current location) are stored in HLR 132. In case of a voice call to wireless device 102, HLR 132 is queried to determine the current location of wireless device 102. VLR 130 is responsible for a group of location areas and stores the data of those wireless devices that are currently in its area of responsibility. This includes parts of the permanent wireless device data that have been transmitted from HLR 132 to VLR 130 for faster access. However, VLR 130 may also assign and store local data, such as temporary identifications. Optionally, VLR 130 can be enhanced for more efficient co-ordination of GPRS and non-GPRS services and functionality (e.g. paging for circuit-switched calls, and combined GPRS and non-GPRS location updates).

Being part of the GPRS network, a Serving GPRS Support Node (SGSN) is at the same hierarchical level as MSC 126 and keeps track of the individual locations of wireless devices. An SGSN also performs security functions and access control. Further, a Gateway GPRS Support Node (GGSN) provides interworking with external packet-switched networks and is connected with SGSNs via an IP-based GPRS backbone network. The SGSN performs authentication and cipher setting procedures based on the same algorithms, keys, and criteria as in existing GSM. For SMS transfer over GPRS, the SGSN is used in place of MSC 126.

In order to access GPRS services, wireless device 102 first makes its presence known to wireless network 104 by performing what is known as a GPRS "attach". This operation establishes a logical link between wireless device 102 and the SGSN and makes wireless device 102 available to receive, for example, pages via SGSN, notifications of incoming GPRS data, or SMS messages over GPRS. In order to send and receive GPRS data, wireless device 102 assists in activating the packet data address that it wants to use. This operation makes wireless device 102 known to the GGSN; interworking with external data networks can thereafter commence. User data may be transferred transparently between wireless device 102 and the external data networks using, for example, encapsulation and tunneling. Data packets are equipped with GPRS-specific protocol information and transferred between wireless device 102 and the GGSN.

SMS makes use of SMS-SC 128 which acts as a store-and-forward system for relaying short messages. Messages are stored in the network until the destination device becomes available, so a user can receive or transmit an SMS message at any time, whether a voice call is in progress or not. SMS-SC 128 may be integrated with a Gateway MSC For Short Message Service (SMS-GMSC) and an Interworking MSC for Short Message Service (SMS-IWMSC), as would be the case shown in FIG. 1. An SMS-GMSC is a function for receiving a short message from an SMS-SC, interrogating an HLR for routing information and SMS info, and delivering the short message for the recipient MS. An SMS-IWMSC is a function for receiving a short message from within the network and submitting it to the recipient SMS-SC. Other messages which may be delivered are Multimedia Messaging Service (MMS) messages. The above configuration is preferably provided in substantial accordance with $3^{rd}$ Generation Partnership Project, Technical Specification 03.40, V6.2.0, 2001-12 (Release 1997) (3GPP TS 03.40).

As apparent from the above, the wireless network includes fixed network components including RF transceivers, amplifiers, base station controllers, network servers, and servers connected to network. Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
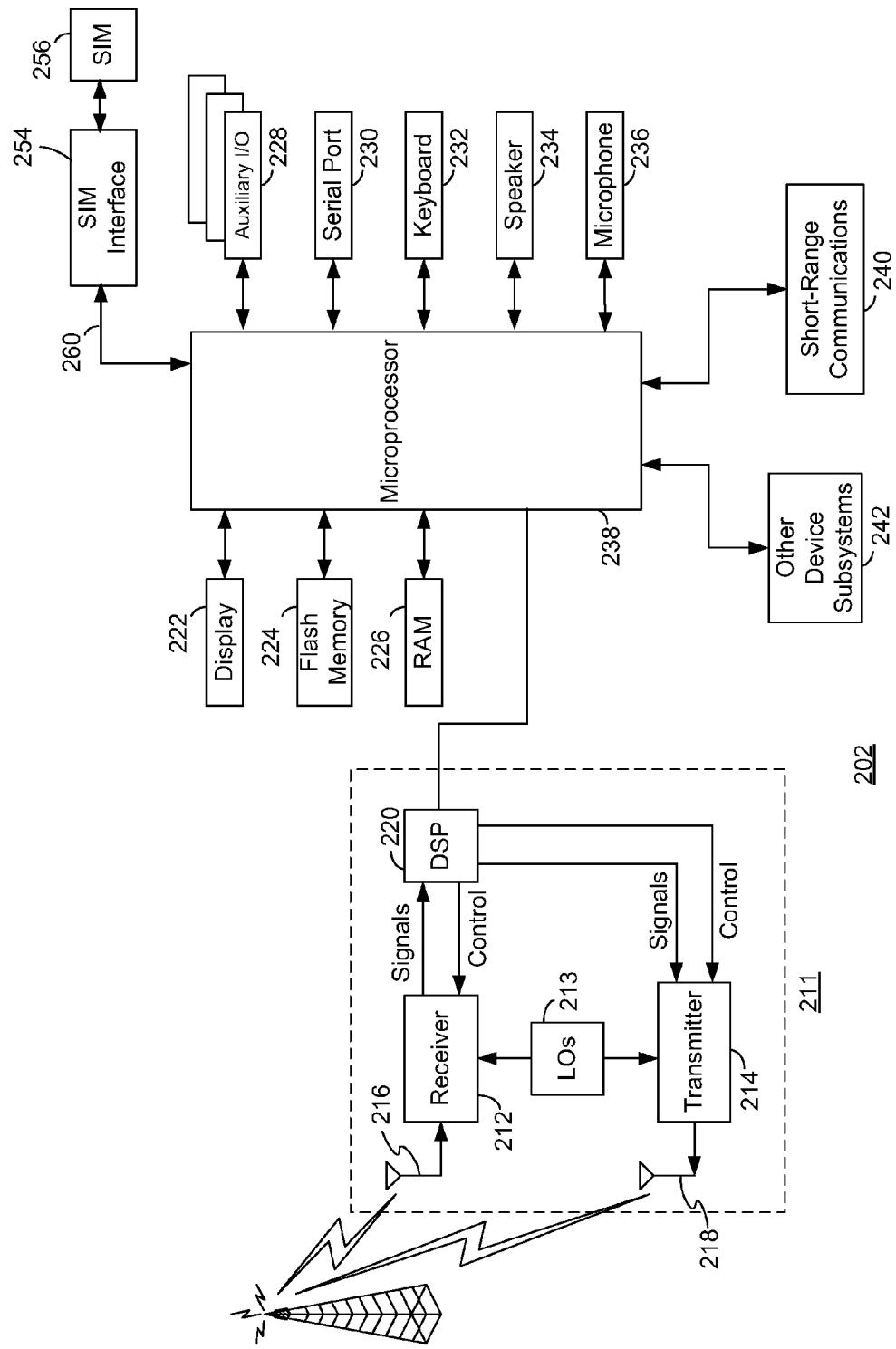
FIG. 2 is a more detailed example of a wireless communication device for use in the wireless communication network.

Preferred Wireless Communication Device. FIG. 2 is a detailed block diagram of a preferred wireless communication device 202. Wireless device 202 is preferably a two-way communication device having at least voice and data communication capabilities, including the capability to communicate with other computer systems. Depending on the functionality provided by wireless device 202, it may be referred to as a data messaging device, a two-way pager, a cellular telephone with data messaging capabilities, a wireless Internet appliance, or a data communication device (with or without telephony capabilities). Wireless device 202 may be a mobile station, as it is in the preferred embodiment.

If wireless device 202 is enabled for two-way communication, it will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which wireless device 202 is intended to operate.

Network access requirements will also vary depending upon type of network utilized. In GPRS networks, for example, network access is associated with a subscriber or user of wireless device 202. A GPRS device therefore operates in conjunction with a Subscriber Identity Module, commonly referred to as a "SIM" card 256, in order to operate on the GPRS network. Without such a SIM card 256, a GPRS device will not be fully functional. Local or non-network communication functions (if any) may be operable, but wireless device 610 will be unable to carry out any functions involving communications over the network. SIM 256 includes those features described in relation to FIG. 1.

Wireless device 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Wireless device 202 includes a microprocessor 238 (which is one implementation of controller 106 of FIG. 1) which controls overall operation of wireless device 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Data and control lines 260 extend between SIM interface 254 and microprocessor 238 for communicating data therebetween and for control. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM), a battery backed-up RAM, or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on wireless device 202. A predetermined set of applications which control basic device operations, including at least data and voice communication applications (such as a call forwarding control technique), will normally be installed on wireless device 202 during its manufacture. A preferred application that may be loaded onto wireless device 202 may be a personal information manager (PIM) application having the ability to organize and manage data items relating to user such as, but not limited to, e-mail, calendar events, voice mails, appointments, and task items. Naturally, one or more memory stores are available on wireless device 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the wireless device user's corresponding data items stored and/or associated with a host computer system thereby creating a mirrored host computer on wireless device 202 with respect to such items. This is especially advantageous where the host computer system is the wireless device user's office computer system. Additional applications may also be loaded onto wireless device 202 through network, an auxiliary I/O subsystem 228, serial port 230, short-range communications subsystem 240, or any other suitable subsystem 242, and installed by a user in RAM 226 or preferably a non-volatile store for execution by microprocessor 238. Such flexibility in application installation increases the functionality of wireless device 202 and may provide enhanced on-device functions, communication-related functions, or both. For example, secure communication applications may enable electronic commerce functions and other such financial transactions to be performed using wireless device 202.

In a data communication mode, data such as an SMS message will be processed by communication subsystem 211 and input to microprocessor 238. Microprocessor 238 will preferably further process the signal for output to display 222 or alternatively to auxiliary I/O device 228. A user of wireless device 202 may also compose data items, such as SMS messages, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of wireless device 202 is substantially similar, except that the received signals would be output to speaker 234 and signals for transmission would be generated by microphone 236. Alternative voice or audio I/O subsystems, such as a voice message recording subsystem, may also be implemented on wireless device 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of wireless device 202 by providing for information or software downloads to wireless device 202 other than through a wireless communication network. The alternate download path may, for example, be used to load an encryption key onto wireless device 202 through a direct and thus reliable and trusted connection to thereby provide secure device communication.

Short-range communications subsystem 240 of FIG. 2 is an additional optional component which provides for communication between wireless device 202 and different systems or devices, which need not necessarily be similar devices. For example, subsystem 240 may include an infrared device and associated circuits and components, a Bluetooth™ communication module, or an 802.11 communication module, to provide for communication with similarly-enabled systems and devices. Bluetooth™ is a registered trademark of Bluetooth SIG, Inc. Those skilled in the art will appreciate that "Bluetooth" and "802.11" refer to sets of specifications, available from the Institute of Electrical and Electronics Engineers (IEEE), relating to wireless personal area networks and wireless local area networks, respectively.

Wireless device 202 also includes a battery interface (such as that described in relation to FIG. 1) for receiving one or more rechargeable batteries. Such a battery provides electrical power to most if not all electrical circuitry in wireless device 202, and the battery interface provides for a mechanical and electrical connection for it. The battery interface is coupled to a regulator which regulates power to all of the circuitry.

Figure 3:
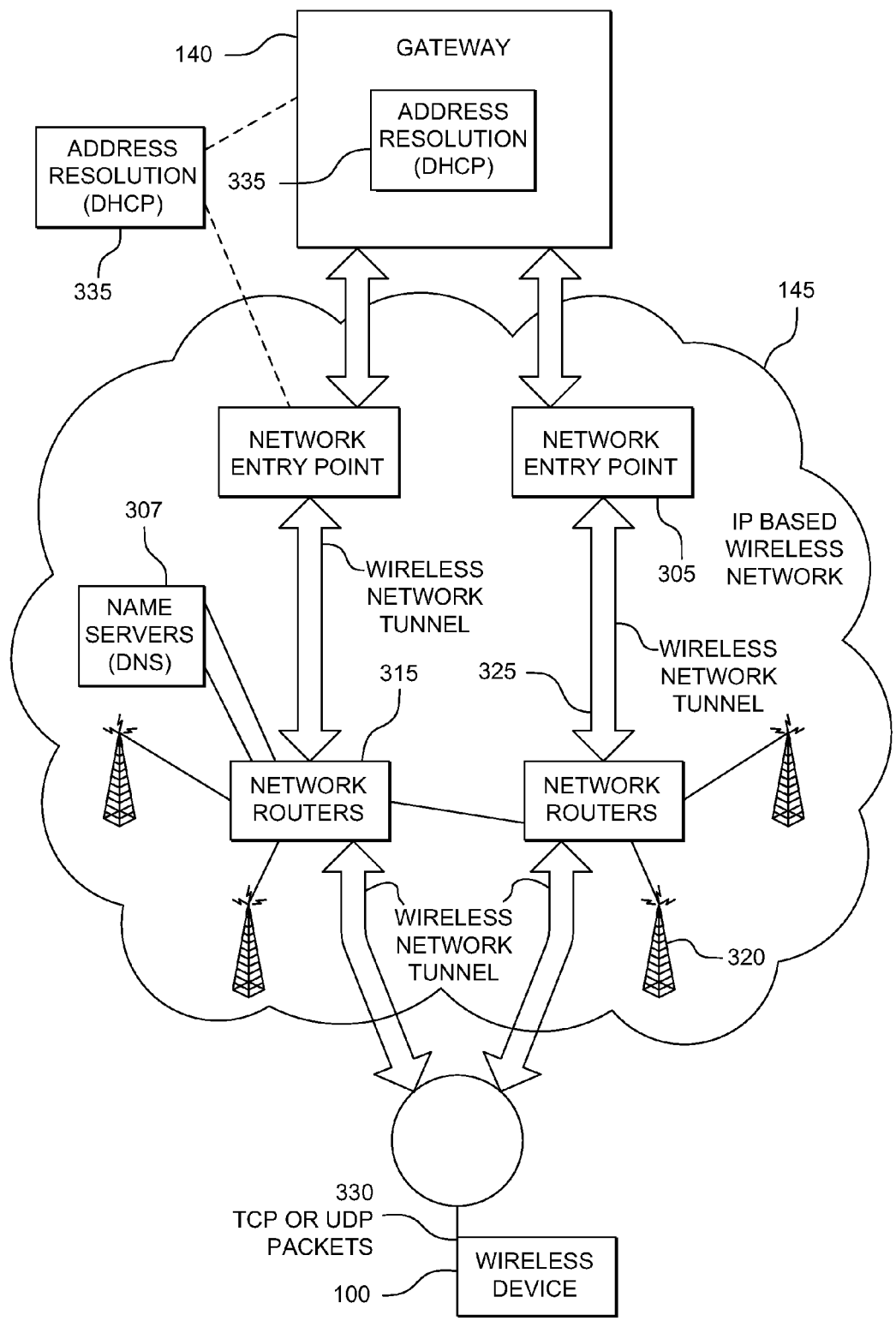
FIG. 3 is a particular structure of a system for communicating with the wireless communication device.

Example Network Configuration. FIG. 3 shows a particular system structure for communicating with a wireless communication device. In particular, FIG. 3 shows basic components of an IP-based wireless data network, such as a GPRS network. A wireless device 100 communicates with a wireless packet data network 145, and may also be capable of communicating with a wireless voice network (not shown). The voice network may be associated with IP-based wireless network 145 similar to, for example, GSM and GPRS networks, or alternatively may be a completely separate network. The GPRS IP-based data network is unique in that it is effectively an overlay on the GSM voice network. As such, GPRS components will either extend existing GSM components, such as base stations 320, or require additional components to be added, such as an advanced Gateway GPRS Service Node (GGSN) as a network entry point 305.

As shown in FIG. 3, a gateway 140 may be coupled to an internal or external address resolution component 335 and one or more network entry points 305. Data packets are transmitted from gateway 140, which is source of information to be transmitted to wireless device 100, through network 145 by setting up a wireless network tunnel 325 from gateway 140 to wireless device 100. In order to create this wireless tunnel 325, a unique network address is associated with wireless device 100. In an IP-based wireless network, however, network addresses are typically not permanently assigned to a particular wireless device 100 but instead are dynamically allocated on an as-needed basis. It is thus preferable for wireless device 100 to acquire a network address and for gateway 140 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and wireless devices. In this example, address resolution component 335 is shown as a dynamic host configuration protocol (DHCP) as one method for providing an address resolution mechanism.

A central internal component of wireless data network 345 is a network router 315. Normally, network routers 315 are proprietary to the particular network, but they could alternatively be constructed from standard commercially available hardware. The purpose of network routers 315 is to centralize thousands of base stations 320 normally implemented in a relatively large network into a central location for a long-haul connection back to network entry point 305. In some networks there may be multiple tiers of network routers 315 and cases where there are master and slave network routers 315, but in all such cases the functions are similar. Often network router 315 will access a name server 307, in this case shown as a dynamic name server (DNS) 307 as used in the Internet, to look up destinations for routing data messages. Base stations 320, as described above, provide wireless links to wireless devices such as wireless device 100.

Wireless network tunnels such as a wireless tunnel 325 are opened across wireless network 345 in order to allocate necessary memory, routing, and address resources to deliver IP packets. In GPRS, such tunnels 325 are established as part of what are referred to as "PDP contexts" (i.e. data sessions). To open wireless tunnel 325, wireless device 100 must use a specific technique associated with wireless network 345. The step of opening such a wireless tunnel 325 may require wireless device 100 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one wireless device 100 for redundancy, or to access different gateways and services on the network. Once the domain name is found, the tunnel is then extended to network entry point 305 and necessary resources are allocated at each of the nodes along the way. Network entry point 305 then uses the address resolution (or DHCP 335) component to allocate an IP address for wireless device 100. When an IP address has been allocated to wireless device 100 and communicated to gateway 140, information can then be forwarded from gateway 140 to wireless device 100.

Wireless tunnel 325 typically has a limited life, depending on wireless device's 100 coverage profile and activity. Wireless network 145 will tear down wireless tunnel 325 after a certain period of inactivity or out-of-coverage period, in order to recapture resources held by this wireless tunnel 325 for other users. The main reason for this is to reclaim the IP address temporarily reserved for wireless device 100 when wireless tunnel 325 was first opened. Once the IP address is lost and wireless tunnel 325 is torn down, gateway 140 loses all ability to initiate IP data packets to wireless device 100, whether over Transmission Control Protocol (TCP) or over User Datagram Protocol (UDP).

In the present disclosure, an "IP-based wireless network" (one specific type of wireless communication network) may include but is not limited to: (1) a Code Division Multiple Access (CDMA) network that has been developed and operated by Qualcomm; (2) a General Packet Radio Service (GPRS) network for use in conjunction with Global System for Mobile Communications (GSM) network both developed by standards committee of European Conference of Postal and Telecommunications Administrations (CEPT); and (3) future third-generation (3G) networks like Enhanced Data rates for GSM Evolution (EDGE) and Universal Mobile Telecommunications System (UMTS). It is to be understood that although particular IP-based wireless networks have been described, techniques of the present disclosure could be utilized in any suitable type of wireless network.

The infrastructure shown and described in relation to FIG. 3 may be representative of each one of a number of different communication networks which are provided and available in the same geographic region. One of these communication networks will be selected by the wireless device, either in an automatic or manual fashion, for communications.

Figure 4:
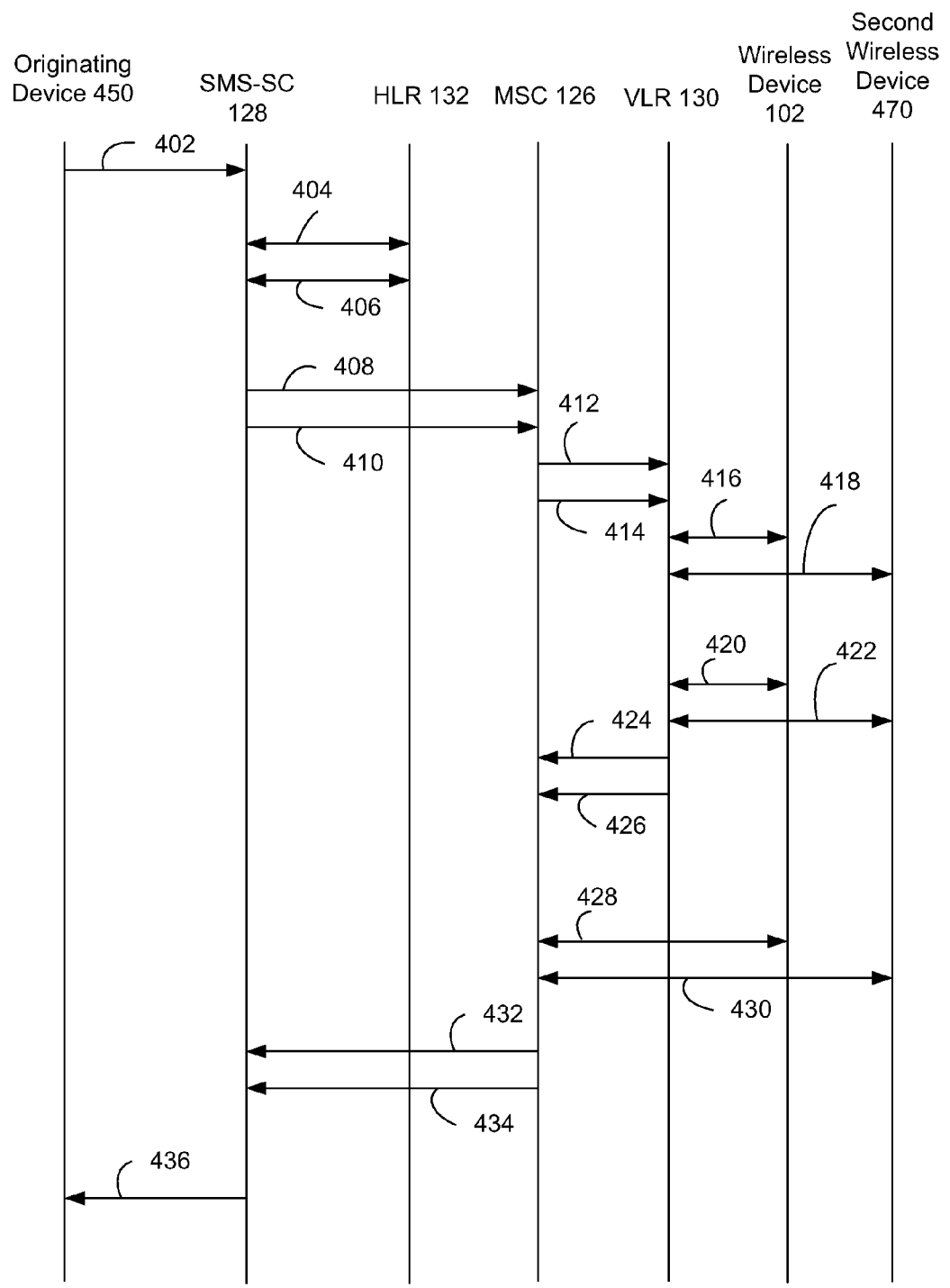
FIG. 4 is a first flow diagram which illustrates a method for use in simultaneously delivering a Short Message Service (SMS) message to two or more associated wireless communication devices operating in the wireless communication network (mobile-terminated example)

SMS Message Delivery To Two Different Mobile Devices. The first part of the present disclosure relates to the sending of SMS messages simultaneously to two or more associated wireless communication devices. FIG. 4 is a flow diagram which describes a method for use in delivering a message (e.g. an SMS message) simultaneously to two or more associated wireless communication devices. Such a method may be employed in connection with components shown and described above in relation to FIGS. 1-3. FIG. 4 relates particularly to a method involving the two or more wireless devices which receive the message (i.e. mobile-terminated message).

In general, the method of FIG. 4 involves receiving a request to deliver an SMS message to a first wireless communication device identified by a first address. In response to the request, the SMS message is delivered to the first wireless communication device as well as to a second wireless communication device identified by a second address different from the first address. In a preferred scenario, the first and the second wireless devices are possessed by the same end user so that messages can be received without fail regardless of which device is being used at any given moment. This method may be executed by a server in the wireless network or, alternatively, by the wireless communication device itself.

Initially, an end user of an originating wireless device 450 uses a keyboard (or other user interface device) to navigate through a menu of features displayed on the visual display. The end user finds and selects an "SMS message sending feature" provided by originating device 450, composes the SMS message, and depresses a button to send the SMS message to a wireless device (e.g. wireless device 102) which is identified by a first address (e.g. a first MSISDN). This causes the SMS message to be sent from originating device 450 to SMS-SC 128 (step 402), which is identified by its own phone number stored at originating device 450.

In response to receiving this message, SMS-SC 128 interrogates HLR 132 and receives routing information for wireless device 102 associated with the first address as is conventional (step 404). However, SMS-SC 128 also identifies a second address (e.g. a second MSISDN) of a second wireless device 470 which is associated with wireless device 102. This may be performed, for example, by issuing a query to a database to retrieve the additional address or addresses. Once the additional second address is identified, SMS-SC 128 interrogates HLR 132 to receive routing information for second wireless device 470 having this second address (step 406).

SMS-SC 128 then sends the short message to MSC 126 with use of a forward short message operation (e.g. "forwardShortMessage") for wireless device 102 (step 408). In addition, SMS-SC 128 sends the same short message to MSC 126 with use of the forward short message operation for second wireless device 470 (step 410). MSC 126 retrieves subscriber information for wireless device 102 from VLR 130, using an optional authentication procedure (step 412). Similarly, MSC 126 retrieves subscriber information for second wireless device 470 from VLR 130 (step 414).

Figure 6:
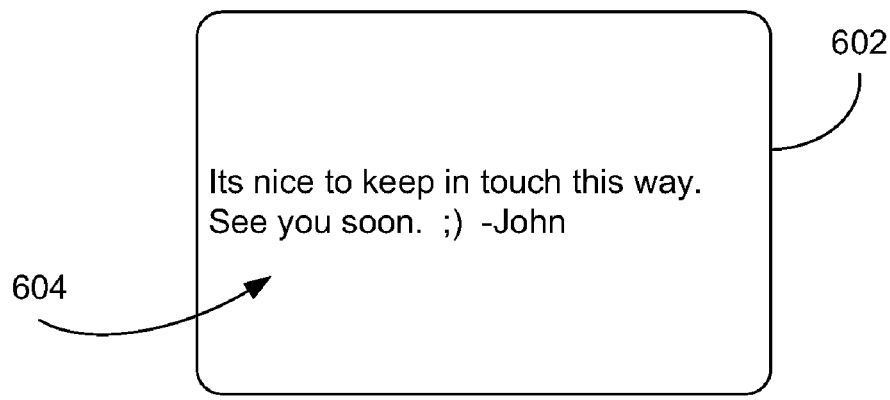
FIG. 6 is an illustration of a visual display of a first wireless communication device which receives an SMS message.
Figure 7:
FIG. 7 is an illustration of a visual display of a second wireless communication device which also receives the SMS message in accordance with the techniques of the present disclosure.

MSC 126 then transfers the short message to wireless device 102 by issuing a page (step 416), performing authentication (step 420), receiving acknowledgement (step 424), and transferring the message (step 428). Similarly, MSC 126 transfers the same short message to second wireless device 470 by issuing a page (step 418), performing authentication (step 422), receiving acknowledgement (step 426), and transferring the message (step 430). To further illustrate, FIGS. 6 and 7 show examples of visual displays 602 and 702 corresponding to wireless device 102 and second wireless device 470, respectively, displaying the SMS message. As illustrated in FIG. 6, an SMS message 604 is delivered to wireless device 102 and may be shown in its visual display 602; similarly, SMS message 604 is delivered to second wireless device 470 and may be shown in its visual display 702, as illustrated in FIG. 7.

Returning back to FIG. 4, MSC 126 may then return to SMS-SC 128 the outcome of the forward short message operation for wireless device 102. Similarly, MSC 126 may return to SMS-SC 128 the outcome of the operation for second wireless device 470. Assuming both message transfers are successful, SMS-SC 128 returns a status report indicating delivery of the short message to the originating wireless device.

As apparent from FIG. 4, the same short message is simultaneously delivered to two different wireless devices which may be owned and/or possessed by the same user. The method described in relation to FIG. 4 assumes that wireless device 102 and second wireless device 470 are each operating on the same network having the same MSC 126; however they may be on different networks or use different MSCs. Further, although each step outlined in FIG. 4 is illustrated as being performed simultaneously "in step" with the other, they do not need to be performed so closely in time together. What matters is that the short message gets delivered to both wireless devices substantially at the same time (e.g. within a few minutes from each other). Finally, although two wireless devices are described as having the same message delivered to them, more than two wireless devices may be involved.

Although the additional functionality of the present disclosure is described as being associated with SMS-SC 128 of FIG. 4, the sending of the short message to two different device addresses may be alternatively employed in wireless device 102. For example, although the end user of originating device 450 may depress the button on the device only once to submit the short message, this may cause originating device 450 to send the short message to both wireless device 102 and second wireless device 470 (i.e. sequentially send two messages to two different addresses). In this particular embodiment, SMS-SC 128 operates in a conventional fashion.

Figure 5:
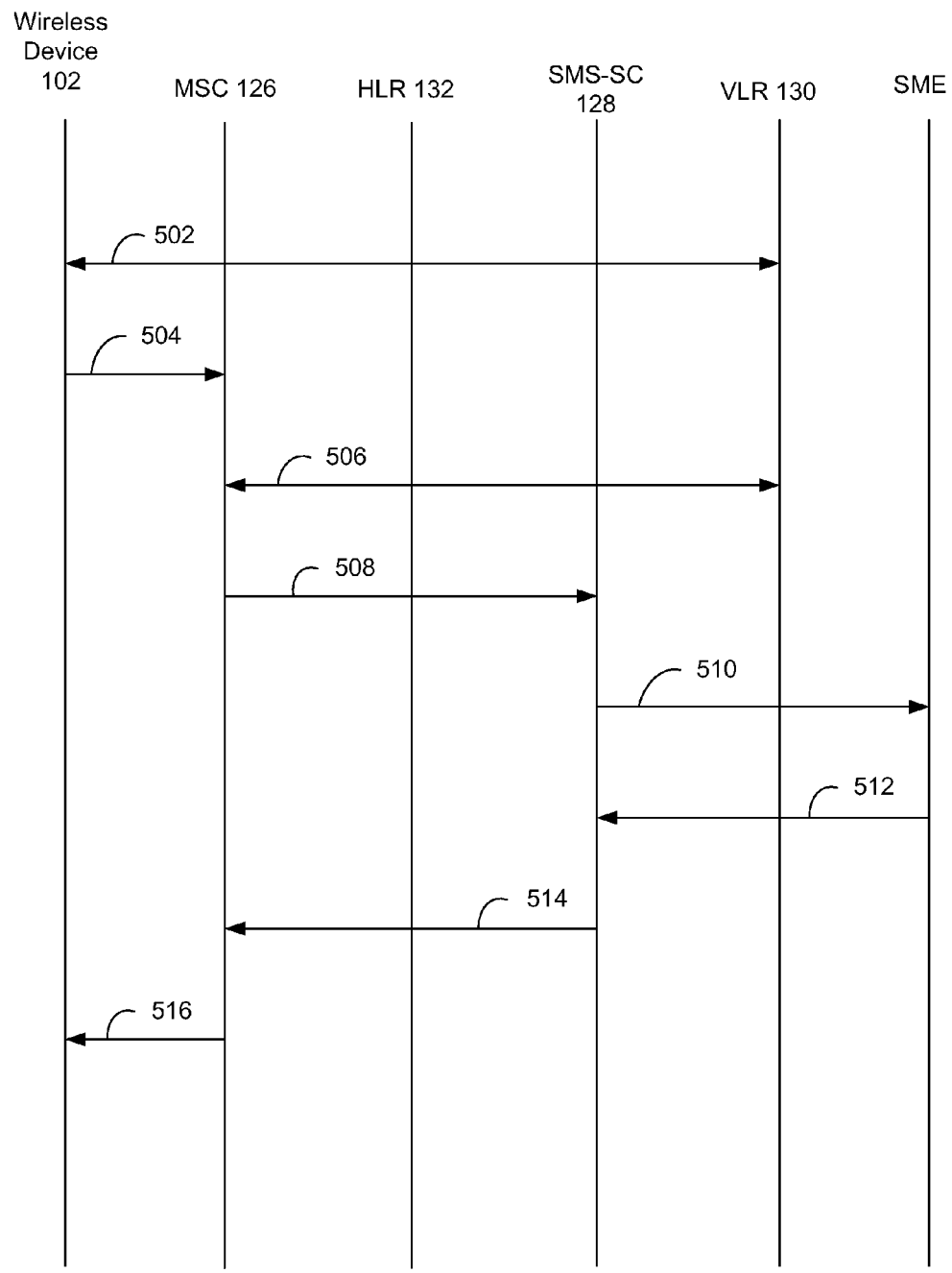
FIG. 5 is a second flow diagram which illustrates a method for use in simultaneously delivering an SMS message to two or more associated wireless communication devices operating in the wireless communication network (mobile-originated example)

FIG. 5 is another flow diagram which describes another method for use in delivering a message (e.g. an SMS message) simultaneously to two or more associated wireless communication devices. Such a method may be employed in connection with components shown and described above in relation to FIGS. 1-3. FIG. 5 relates particularly to a method involving the wireless device which sends or originates (i.e. mobile-originated message).

In general, the method of FIG. 5 involves receiving a request to deliver a message from a first wireless communication device identified by a first address to a second wireless communication device identified by a second address. In response to this request, the message is delivered to the second wireless communication device along with a message-originating address that identifies a third wireless communication device. In a preferred scenario, the first and the third wireless communication devices are possessed by the same end user so that messages delivered therefrom can be identified from a single address regardless of which device is being used by the end user at any given moment. This method may be executed by a server in the wireless network or, alternatively, by the wireless communication device itself.

Initially, an originating wireless device 102 is powered on and registers with the wireless network (step 502). An end user of originating wireless device 102 uses a keyboard (or other user interface device) to navigate through a menu of features displayed on the visual display. The end user finds and selects an "SMS message sending feature" provided by originating wireless device 102, composes the SMS message, and depresses a button to send the SMS message to a wireless device (e.g. a short message entity or SME in FIG. 5). This causes the SMS message to be sent from originating device 450 to MSC 126 (step 504). In response, MSC 126 interrogates VLR 130 to verify that the message transfer does not violate the supplementary services invoked or restrictions imposed (step 506). Next, MSC 126 sends the short message to SMS-SC 128 using the forward short message operation (e.g. "forwardShortMessage") (step 508). In response, SMS-SC 128 delivers the short message to the SME (step 510) with an optional acknowledgement (step 512). SMS-SC 128 acknowledges to MSC 126 a successful outcome of the forward short message operation (step 514). Finally, MSC 126 returns to wireless device 102 the outcome of the operation (step 516).

The method of FIG. 5 of the present disclosure differs from conventional methods in that the SMS message is sent with a message-originating address (e.g. an MSISDN) that is different from the address normally used to identify wireless device 102. In particular, the message-originating address sent with the SMS message is the address of a wireless communication device that is associated with wireless device 102. In a preferred scenario, the message-originating address may be that of another different wireless device that is owned and/or possessed by the same end user. In this way, short messages from the same end user appear to be sent by the same device/user.

The special addressing technique of FIG. 5 may be employed at a server in the wireless network (e.g. SMS-SC 128) or, alternatively, by the wireless communication device itself (e.g. originating wireless device 102). For example, SMS-SC 128 may receive the short message from wireless device 102, subsequently identify the alternative address associated with it and accordingly change the message-originating address (prior to step 510). A query to a database may be used to retrieve this alternative address associated with the original address of wireless device 102.

As another example, wireless device 102 may itself automatically insert the alternate address (different from its normal address) prior to sending the short message to MSC 126 (prior to step 504). Preferably, the procedure to modify the originating address is subject to an appropriate security mechanism to prevent misuse (e.g. "spoofing"). For example, one such method may involve inserting the SIM from the other wireless communication device into wireless device 102 temporarily, so that a certificate or other authority can be granted to allow wireless device 102 to temporarily use the MSISDN from the other device (e.g. for a predetermined time period or a predetermined number of messages).

The above techniques described in relation to FIGS. 4 and 5 are preferably provided in accordance with $3^{rd}$ Generation Partnership Project, Technical Specification 03.40, V6.2.0, 2001-12 (Release 1997) (3GPP TS 03.40), having suitable modifications made as desired.

SMS Message Forwarding. The second part of present disclosure relates to the forwarding of SMS messages to alternate devices, such as alternate mobile communication devices. SMS enhancements such as Forwarding Short Messages and Storing Short Messages in the network that have been debated in the past in standards groups including SMG4 and T2. At the time, it was concluded that it was too complex both technically and commercially. To illustrate, a mobile subscriber may receive SMS messages from any service center (SC) in any network operator's domain as well as their SC of a home public land mobile network (PLMN). If a mobile subscriber wishes to have their short messages forwarded to another MSISDN or any other destination address, then an agreement may be made with their home PLMN SC. That would work for any SMS messages that are to be delivered via the subscriber's home PLMN SC. However, this cannot easily work without highly complex agreements with any SMS messages that are to be delivered to that subscriber from any other SC in other PLMN domains. The consequence is that SMS forwarding would be ineffective unless the forwarding mechanism applied to every SC in every network operator's domain. Additionally, even if it were possible to have some commercial agreement, it is highly likely that such an agreement and SC capability in non-home PLMN SC's would have to be optional. This would make the Forwarding service useless as the recipient would still receive short messages to the unwanted destination.

According to the present disclosure, one solution to this problem lies in the use of "virtual mobile equipment" in the network. Such equipment may be based on existing Virtual Mobile Equipment (VME) technologies. VME is an existing platform in mobile network infrastructure (typically in the network operator's domain) that allows a list of mobile MSISDN's to exist as though they correspond to actual mobile devices. In conventional VME techniques, a short message sent from the SC of a non-home PLMN domain to an MSISDN of a home PLMN domain will be routed from the non-HPLM domain SC to the Home PLMN. Such a message does not get routed via the home PLMN SC but normally across the home PLMN to the mobile device. If, however, the MSISDN is not a real mobile device but an entry in the VME then the home PLMN will route the short message to the VME. From there, the VME can route the short message to a fixed network entity such as a bank or media such as the BBC, thereby allowing fixed network service to be deployed without the need for the fixed network service (such as a bank or BBC) to make a connection to every SC of every network operator.

This platform or any other suitably-situated platform or equipment may be utilized for "Short Message Forwarding" of the present disclosure. A mobile device wishing to invoke a forwarding function may inform the home PLMN by requesting that the MSISDN of the mobile device be assigned to the VME. See VME 199 in FIG. 1. After this, any short messages that arrive in the home PLMN will be routed to the VME. In this example, the only other requirement may be for the requesting mobile device to supply a forwarding address. This can be either an MSISDN or another destination address that is capable of receiving a short message. Upon receipt of a short message having the MSISDN that matches, the VME causes the short message to be forwarded to the forwarding address.

The mobile device may utilize any suitable messaging via the wireless communication network to accomplish the control over short message forwarding. In one embodiment, control of SMS forwarding is performed through use of SMS messaging. For example, Technical Specification (TS) 23.040 currently defines a facility called SMS Commands. This facility allows a mobile device to interact with the SC to instruct it to do something specific with respect to short messages. As an example, one code point currently assigned in the SMS Commands facility allows a mobile device to "DELETE" a previous short message they have sent that is still in the SC awaiting delivery. According to the present disclosure, a code point corresponding to "ACTIVATE CALL FORWARDING" for use in activating the SMS call forwarding feature may be included in the SMS Commands facility, with or without the use of additional parameters such as a forwarding address, which may be explicit or implied. In addition, a different code point corresponding to "CANCEL CALL FORWARDING" for use in cancelling the SMS call forwarding feature may be included in the SMS Commands facility.

As SMS commands are not widely supported either in mobile devices or in the SC's, the use of an alternative messaging means such as an Unstructured Supplementary Services Data (USSD) facility may also facilitate SMS Forwarding requests and cancellations. In general, USSD allows for the transmission of information via a GSM network. USSD also allows for interactive services between a mobile device and applications hosted by the operator. In contrast to SMS, USSD offers a real time connection during a communication session. A USSD message can be up to 182 alphanumeric characters in length. These messages are composed of digits and the #, * keys, and allow users to easily and quickly get information/access services from the operator. A mobile subscriber may directly enter the USSD string and press a button (e.g. call, send, etc.) to send the message. A typical USSD message starts with a "*" character followed by digits which indicate an action to be performed or parameters. Each group of numbers is separated by the "*" character and the message is terminated with a "#" character. A USSD gateway, in turn, interacts with external applications based on the USSD command. This allows access to a number of value added services via USSD. Thus, a command code corresponding to "ACTIVATE SMS CALL FORWARDING" for use in activating the SMS call forwarding feature may be included in USSD, with or without the use of additional parameters such as a forwarding address, which may be explicit or implied. In addition, a different command code corresponding to "CANCEL SMS CALL FORWARDING" for use in cancelling the SMS call forwarding feature may be included in USSD.

Note that long(er) term short message storage may also be resolved by the VME if storage before receipt is a requirement. As apparent, there is value in a service that allows long term storage of short messages before receipt in the case that the recipient mobile subscriber has some long term absence. Normally, an SC will automatically delete undelivered short messages after a period of time which may be only several days and therefore, by invoking a Forwarding function (with or without supplying a forwarding address), a mobile subscriber could be provided with long term storage while unavailable.

Clearly, the forwarding of short messages is an attractive opportunity for SMS and the strategy described above and herein is a practical way of resolving the problem.

SMS Message Forwarding—General Techniques. When a message forwarding function is enabled for a first mobile communication device which operates in a wireless communication network, the "virtual mobile equipment" in the wireless communication network is assigned a first address which is utilized to identify the first mobile communication device in the wireless communication network. The equipment has access to an association in memory between the first address and a second address which is utilized to identify a second communication device. Subsequently, the equipment receives a short message having a destination address that matches the first address. In response, the equipment sends the short message to the second address for delivery to the second communication device based on the stored association. Note that, when forwarding is enabled, the wireless network and the equipment refrain from causing any delivery of the short message to the first mobile communication device. The functionality along with this equipment may be performed for a plurality of or all mobile communication devices in the wireless communication network, each of which are associated with different addresses (e.g. MSISDNs).

In response to a message forwarding function being enabled for and/or by the first mobile communication device, the equipment is assigned (e.g. temporarily assigned) the first address which is normally utilized to identify the first mobile communication device in the wireless communication network for communications. The assignment of the first address at the equipment may be caused in response to receiving a message forwarding instruction. More particularly, the equipment may receive a message forwarding instruction having the first address and the second address, and the act of being assigned to the first address at the equipment and storing the association between the first address and the second address may be caused by receiving the message forwarding instruction. When the message forwarding function is disabled for and/or by the first mobile communication device, the equipment may be deassigned from the first address which corresponds to the first mobile communication device, so that the first mobile communication device directly (not via the equipment) receives short messages having the destination addresses that match the first address. Again, the functionality for this equipment may be performed for a plurality of or all mobile communication devices in the wireless communication network. The forwarding equipment may be or include a server, and/or a database (memory) which stores the associations between the addresses. The equipment may be network equipment which includes one or more communication transceivers and one or more processors adapted to operate in the required manner, for example, in accordance with computer instructions. A computer program product may include a computer readable medium and the computer instructions stored in the computer readable medium, where the computer instructions are executable by the one or more processors for performing the required tasks. The first address may be a Mobile Station International ISDN (MSISDN) of the first mobile communication device, and the second address may be a second MSISDN of the second communication device which comprises a second mobile communication device. Alternatively, the second communication device may be a server, or more particularly a database server for storing short messages (associated with the first address) for the first mobile communication device in a database.

Figure 8:
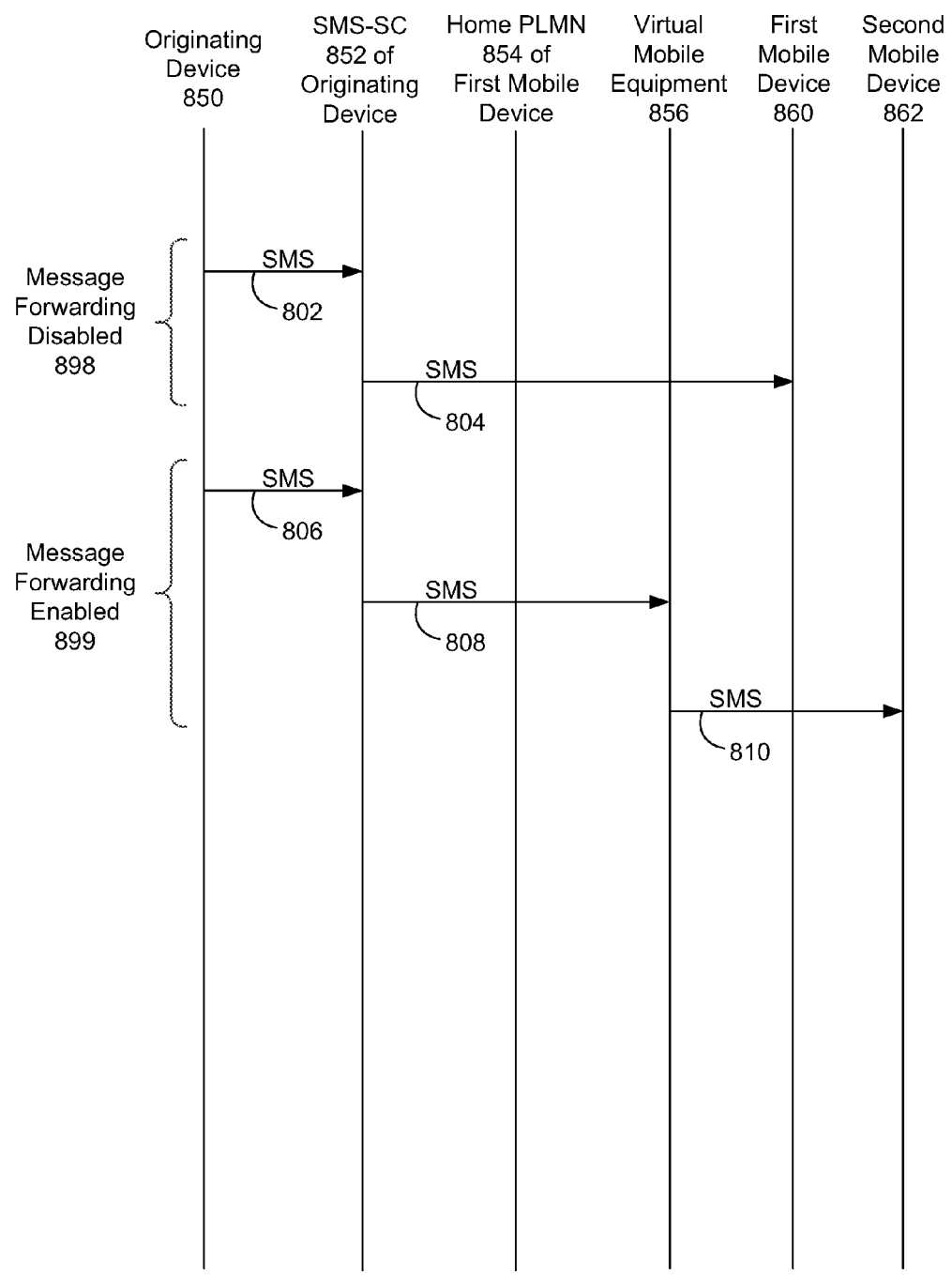
FIG. 8 is a process flow diagram for delivering and forward short messages for mobile communication devices in a wireless communication network.
Figure 9:
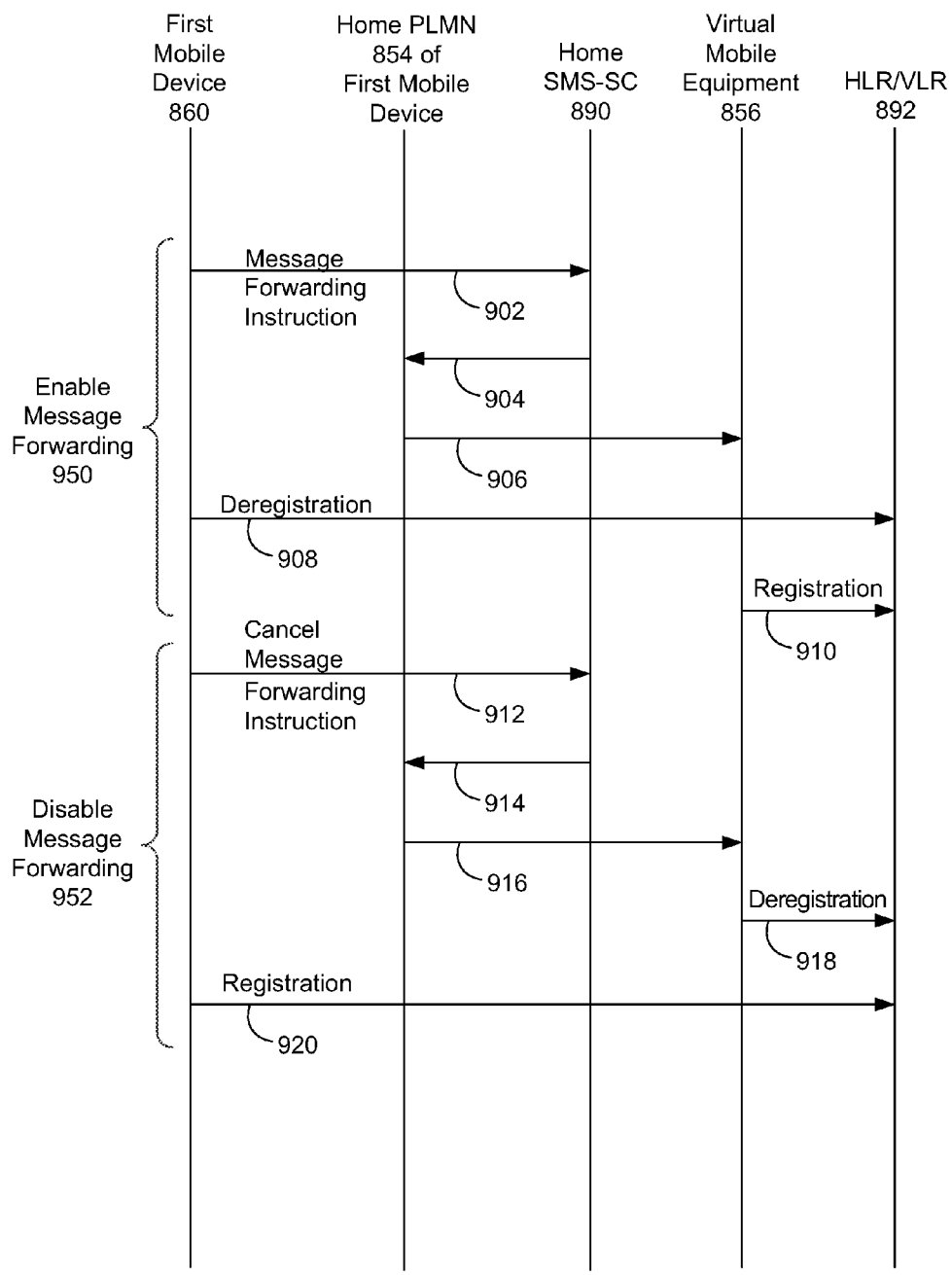
FIG. 9 is a process flow diagram of one example for enabling and disabling this message forwarding feature.

SMS Message Forwarding—Illustrative Techniques in FIGS. 8 and 9. FIG. 8 is a general process flow diagram for delivering and forward short messages for mobile communication devices in a wireless communication network. FIG. 9 is a general process flow diagram for enabling and disabling this message forwarding feature.

First with respect to FIG. 8, various devices are indicated in the diagram which include an originating communication device 850 (such as a message-originating mobile communication device), a short message service center (SMS-SC) 852 of the originating communication device, a home public land mobile network (PLMN) 854, a virtual mobile equipment 856 (e.g. VME-based technology) of home PLMN 854, a first mobile communication device 860 having the home PLMN 854, and a second communication device 862 (such as a second mobile communication device). Home PLMN 854 is the home network of first mobile communication device 860, but not (necessarily) of originating communication device 850. Providing a message forwarding feature for short messaging for communication devices in a simple and consistent manner is made more complicated when originating communication device 802 is not a subscriber of home PLMN 854 but an alternative PLMN or carrier.

Process operations 898 of FIG. 8 where no message forwarding feature is enabled (or message forward feature is disabled) will first be described. An SMS message may be originated and initiated from originating communication device 850 and intended for delivery to first mobile communication device 860. This SMS message has a destination address which matches a first address (e.g. a first MSISDN) corresponding to first mobile communication device 860. The SMS message also has a message center address which matches the address of SMS-SC 852 of the originating device's network. Thus, the SMS message intended for first mobile communication device 860 may be initially routed to SMS-SC 852 of the originating device (step 802 of FIG. 8). SMS-SC 852 receives this SMS message and, after interrogation of the HLR/VLR to locate first mobile communication device 860, will cause the message to be delivered to first mobile communication device 860 (step 804 of FIG. 8).

Process operations 899 where the message forwarding feature is enabled will now be described. Again, an SMS message may be originated and initiated from originating communication device 850 and intended for delivery to first mobile communication device 860. This SMS message has a destination address which matches the first address (i.e. the first MSISDN) corresponding to first mobile communication device 860. The SMS message also has a message center address which matches the address of SMS-SC 852 of the originating device's network. Thus, the SMS message intended for first mobile communication device 860 may be initially routed to SMS-SC 852 of the originating device (step 806 of FIG. 8). SMS-SC 852 receives this SMS message will interrogate the HLR/VLR to locate first mobile communication device 860. However, since the message forwarding feature has been enabled, virtual mobile equipment 856 has assumed the identity of first mobile communication device 860 and has been assigned the first address (i.e. the first MSISDN) of first mobile communication device 860. Therefore, although SMS-SC 852 will cause the message to be delivered to the first address, it will be routed in home PLMN 854 to virtual mobile equipment 856 (step 808 of FIG. 8).

Virtual mobile equipment 856 has access to an association in memory between the first address and a second address which corresponds to second communication device 862 for message forwarding. The second address may be a second MSISDN of the second communication device which is a mobile communication device. (Alternatively, the second communication device may be a server, or more particularly a database server for storing short messages (associated with the first address) for the first mobile communication device in a database.) Thus, virtual mobile equipment 856 sends (e.g. forwards) the short message to the second address which corresponds to second communication device 862 (step 810 of FIG. 8). Note that the network and virtual mobile equipment 856 refrain from causing any delivery of the short message to first mobile communication device 860. The above-described functionality along with virtual mobile equipment 856 may be performed for a plurality of or all mobile communication devices in the wireless communication network.

FIG. 9 is a process flow diagram for enabling and disabling the message forwarding feature. Other devices in addition to those in FIG. 8 are indicated in the diagram, including a home SMS-SC associated with home PLMN 854 and first mobile communication device 860, and a HLR and/or VLR 892. Process operations 950 for enabling the message forwarding feature will now be described. A message forwarding enable instruction is sent from first mobile communication device 860 to home PLMN 854 (step 902 of FIG. 9). The instruction may include the first address of first mobile communication device 860 and the second address (i.e. the forwarding address) of the second communication device. The first address may be implied and supplied, for example, via Caller ID. The second address may also be implied and/or supplied if indicated or stored previously, or provided as a predetermined address (e.g. in the case where short messages are to be submitted for long term storage in a database).

The message forwarding enable instruction may be entered in by the end user via the user interface (keyboard, keypad, touch screen display, etc.) of first mobile communication device 860. For example, the message forwarding instruction may be entered in as a short message (which is actually a control message to home PLMN 854) and sent to home SMS-SC 890. SMS commands, USSD strings, or any other suitable messaging and/or messaging protocols, may be utilized as one skilled in the art would readily appreciate. The instruction may be for forwarding only short messages, or alternatively for forwarding both short messages and voice calls for first mobile communication device 860. Such instruction may include, as entered by the user in the message field, a command and a forwarding address (e.g. MSISDN).

In response to receiving this instruction, home SMS-SC 890 forwards the instruction or a corresponding instruction to home PLMN 854 for processing of the same (step 904 of FIG. 9). Home PLMN 854 then causes such instruction to be sent to virtual mobile equipment 856 (step 906 of FIG. 9). Virtual mobile equipment 856 receives such instruction along with the first address and the second address. In response, virtual mobile equipment 856 is now assigned to the first address for short message communications (and/or other communications) and causes an association to be made between the first address and the second address and stored for message forwarding purposes. This association may be stored as a record in a database, along with additional such records for other mobile communication devices.

Next, first mobile communication device 860 causes a deregistration message to be sent in home PLMN 854 for affecting the HLR/VLR 892 (step 908 of FIG. 9). In GSM, this deregistration message may be or include what is referred to as an "IMSI detach" message. The deregistration message causes the location of first mobile communication device 860 in HLR/VLR 892 to be set to be unavailable or unknown. Immediately following this operation, virtual mobile equipment 856 causes a registration message to be sent in home PLMN 854 for affecting the HLR/VLR 892 (step 910 of FIG. 9). The registration message from virtual mobile equipment 856 includes the first address of first mobile communication device 860, as virtual mobile equipment 856 will now behave as if it were first mobile communication device 860 (at least for short message receipt). In GSM, this registration message may be or include what is referred to as an "IMSI attach" message. The registration message causes the location for the first address to "point to" virtual mobile equipment 856, as stored in HLR/VLR 892. Short messages having destination addresses that match the first address will now be directed to virtual mobile equipment 856 in home PLMN 854, which will forward as described in relation to process operations 899 in FIG. 8.

Process operations 952 for disabling the message forwarding feature will now be described. A message forwarding cancelling or disable instruction is sent from first mobile communication device 860 to home PLMN 854 (step 912 of FIG. 9). The instruction may include the first address of first mobile communication device 860. The first address may be implied and supplied via Caller ID, for example. This instruction may be entered in by the end user via the user interface (keyboard, keypad, touch screen display, etc.) of first mobile communication device 860. For example, the message forwarding disable instruction may be entered in as a short message (which is actually a control message to home PLMN 854) and sent to home SMS-SC 890. SMS commands, USSD strings, or any other suitable messaging and/or messaging protocols, may be utilized as one skilled in the art may readily appreciate. The instruction may be for cancelling forwarding of short messages only, or alternatively for cancelling forwarding of both short messages and voice calls for first mobile communication device 860. Such instruction may include a command as entered by the user in the message field.

In response to receiving this instruction, home SMS-SC 890 forwards the instruction or a corresponding instruction to home PLMN 854 for processing of the same (step 914 of FIG. 9). Home PLMN 854 then causes such instruction to be sent to virtual mobile equipment 856 (step 916 of FIG. 9). Virtual mobile equipment 856 receives such instruction along with the first address. In response, virtual mobile equipment 856 is now deassigned from the first address for short message communications (and/or other communications) and may cause the association previously made between the first address and the second address to be removed (unless retained for subsequent use). This association may be deleted in the record in the database.

Next, virtual mobile equipment 856 causes a deregistration message to be sent in home PLMN 854 for affecting the HLR/VLR 892 (step 918 of FIG. 9). In GSM, this deregistration message may be or include what is referred to as an "IMSI detach" message. The deregistration message causes the location in HLR/VLR 892 to be set to be unavailable or unknown. Immediately following this operation, first mobile communication device 860 causes a registration message to be sent in home PLMN 854 for affecting the HLR/VLR 892 (step 920 of FIG. 9). The registration message from first mobile communication device 860 includes the first address of first mobile communication device 860, as virtual mobile equipment 856 will no longer behave as if it were first mobile communication device 860 (at least for short message receipt). In GSM, this registration message may be or include what is referred to as an "IMSI attach" message. The registration message causes the location for the first address in HLR/VLR 892 to no longer "point to" virtual mobile equipment 856. Short messages having destination addresses that match the first address will now be directed directly to first mobile communication device 860 in home PLMN 854, which will delivered normally as described in relation to process operations 898 in FIG. 8.

Alternatively, message forwarding instructions may be automatically generated by the network in response to detecting or identifying predetermined conditions associated with first mobile communication device 860. Thus, as an alternative, or in addition to, the techniques described in relation to FIG. 9, the message forwarding may be enabled and/or disabled in response to predetermined conditions which are detected or identified in the wireless network. The predetermined condition may be: an expired period of time over which first mobile communication device 860 is unavailable in the network; an indication that a memory of first mobile communication device 860 for short message storage is above a predetermined threshold (e.g. such memory storage is "full"); or periods of calendar dates and/or time over which short messages should be forwarded and not so forwarded; as some examples. Again, the second address for message forwarding enabling may be implied and/or supplied if indicated or stored previously, or provided as a predetermined address (e.g. in the case where short messages are to be submitted for long term storage in a database).

Thus, methods and apparatus for use in forwarding short messages have been described. One illustrative method involves equipment in a wireless communication network which is adapted to receive an assignment of an address which is normally utilized to identify a mobile communication device in the wireless communication network. An association is stored between the address and an alternate address which is utilized to identify an alternate communication device. A short message having a destination address that matches the address is received at the equipment. In response to receiving the short message, the short message is sent to the alternate address for delivery to the alternate communication device based on the stored association between the address and the alternate address. As apparent, the equipment itself is adapted to receive an assignment of an address normally utilized to identify the mobile communication device in the wireless communication network. The equipment includes one or more processors which are adapted to maintain access to storage of an association between the address and an alternate address utilized to identify an alternate communication device; receive a short message having a destination address that matches the address; and cause the short message to be sent to the alternate address for delivery to the alternate communication device.

Techniques of the present disclosure extend to functionality provided in the mobile communication device and other entities as well. One illustrative method in a mobile communication device is for use in controlling a forwarding of short messages in a wireless communication network. The mobile communication device is associated with an address utilized to identify the mobile communication device in the wireless communication network. In response to receiving, via a user interface of the mobile communication device, a user input comprising a message forwarding enable instruction or message, the mobile communication device deregisters its location from the wireless communication network with respect to the address and causes a message forwarding enable message to be sent to equipment in the wireless communication network. This message forwarding enable message is defined to cause the equipment to register a location of the equipment in the wireless communication network with respect to the address, so that the equipment can receive short messages addressed to the address and forward the short messages to an alternate address which identifies an alternate communication device. In response to receiving, via the user interface, a user input comprising a message forwarding disable instruction or message, the mobile communication device registers its location in the wireless communication network with respect to the address and causes a message forwarding disable message to be sent to the equipment in the wireless communication network. The message forwarding disable message is defined to cause the equipment to deregister its location from the wireless communication network with respect to the address. As apparent, the mobile communication device adapted to control the forwarding of short messages includes a user interface; a wireless transceiver; and one or more processors coupled to the user interface and the wireless transceiver.

The above-described embodiments of invention are intended to be examples only. For example, the forwarding of messages may apply to other types of messages such as email messages. Alterations, modifications, and variations may be effected to particular embodiments by those of skill in art without departing from scope of invention, which is defined solely by claims appended hereto.

What is claimed is:

1. A method in equipment of a wireless communication network for use in forwarding short messages for a mobile communication device having an address which is utilized to identify the mobile communication device in the wireless communication network, the method comprising the acts of:
    storing an association between the address and an alternate address which is utilized to identify an alternate communication device;
    receiving, at the equipment, a short message having a destination address that matches the address; and
    in response to receiving the short message, sending the short message to the alternate address for delivery to the alternate communication device based on the stored association between the address and the alternate address;
    wherein the equipment is assigned the address based on a message forwarding enable function being activated.

2. The method of claim 1, wherein the equipment comprises a virtual mobile equipment in the wireless communication network.

3. The method of claim 1, which is embodied in a computer program product comprising a computer readable medium and computer instructions stored in the computer readable medium, where the computer instructions are executable by one or more processors of the equipment to perform the acts of the method.

4. The method of claim 1, wherein the address is a Mobile Station International ISDN (MSISDN).

5. The method of claim 1, wherein the short message comprises one of a Short Message Service (SMS) message and a Multimedia Messaging Service (MMS) message.

6. The method of claim 1, wherein the alternate communication device comprises an alternate mobile communication device configured to operate in the wireless communication network.

7. The method of claim 1, wherein the alternate communication device comprises a server.

8. The method of claim 1, wherein the alternate communication device comprises a database server for storing short messages for the mobile communication device in a database.

9. The method of claim 1, further comprising:
    registering the equipment in the wireless communication network with the address.

10. The method of claim 1, further comprising:
    receiving, at the equipment, a message forwarding enable instruction; and
    wherein the equipment is assigned to the address in response to receiving the message forwarding enable instruction.

11. The method of claim 1, further comprising:
    receiving, at the equipment, a message forwarding enable instruction having the address and the alternate address.

12. The method of claim 1, further comprising:
    receiving the address from the mobile communication device via the wireless communication network.

13. The method of claim 1, wherein the equipment is assigned to the address in response to the message forwarding enable function being activated for the mobile communication device or activated by the mobile communication device.

14. The method of claim 1, further comprising the acts of:
    deassigning the address from the equipment, so that the mobile communication device receives short messages having the destination addresses that match the address based on a message forwarding disable function being received for the mobile communication device or received by the mobile communication device.

15. The method of claim 1, further comprising:
    identifying a predetermined condition in the wireless communication network; and
    wherein the equipment is assigned the address in response to identifying the predetermined condition.

16. Equipment for use in a wireless communication network for forwarding short messages for a mobile communication device having an address utilized to identify the mobile communication device in the wireless communication network, the equipment comprising:
    one or more processors;
    the one or more processors being configured to:
        maintain access to storage of an association between the address and an alternate address utilized to identify an alternate communication device;
        receive a short message having a destination address that matches the address; and
        send the short message to the alternate address for delivery to the alternate communication device;
        wherein the equipment is assigned the address based on a message forwarding enable function being activated.

17. The equipment of claim 16, wherein the alternate communication device comprises an alternate mobile communication device configured to operate in the wireless communication network.

18. The equipment of claim 16, wherein the alternate communication device comprises a server.

19. The equipment of claim 16, wherein the alternate communication device comprises a database server for storing short messages for the mobile communication device in a database.

20. The equipment of claim 16, wherein the one or more processors are further configured to:
    register the equipment in the wireless communication network with the address.

21. The equipment of claim 16, wherein the one or more processors are further configured to:
    receive a message forwarding enable instruction; and
    wherein being assigned the address at the equipment is caused in response to receiving the message forwarding enable instruction.

22. The equipment of claim 16, wherein the one or more processors are further configured to:
    receive a message forwarding enable instruction having the address and the alternate address.

23. The equipment of claim 16, wherein the one or more processors are further configured to:
    receive the alternate address from the mobile communication device via the wireless communication network.

24. The equipment of claim 16, wherein the equipment is assigned the address when the message forwarding enable function is activated for mobile communication device or by the mobile communication device.

25. The equipment of claim 16, wherein the one or more processors are further configured to:
    when a message forwarding disable function is activated for and/or by the mobile communication device: being deassigned from the address, so that the mobile communication device receives short messages having the destination addresses that match the address.

26. A method in a mobile communication device for use in controlling a forwarding of short messages in a wireless communication network, the method comprising the acts of:
    receiving, via a user interface, a user input comprising a message forwarding enable instruction or message;
    in response to the receiving of the user input comprising the message forwarding enable instruction or message:
        causing a message forwarding enable message to be sent to equipment in the wireless communication network, the message forwarding enable message being defined to cause the equipment to register its location in the wireless communication network with respect to an address associated with the mobile communication device, for receipt and forwarding of short messages addressed to the address to an alternate address which identifies an alternate communication device;
    receiving, via the user interface, a user input comprising a message forwarding disable instruction or message; and
    in response to the receiving of the user input comprising a message forwarding disable instruction or message:
        causing a message forwarding disable message to be sent to the equipment in the wireless communication network, the message forwarding disable message being defined to cause the equipment to deregister its location from the wireless communication network with respect to the address.

27. The method of claim 26, further comprising:
    in response to the receiving of the user input comprising the message forwarding disable instruction or message:
        registering a location of the mobile communication device in the wireless communication network with respect to the address.

28. The method of claim 26, further comprising:
    in response to the receiving of the user input comprising the message forwarding enable instruction or message:
        deregistering a location of the mobile communication device from the wireless communication network with respect to the address.

29. The method of claim 26, further comprising:
    in response to the receiving of the user input comprising the message forwarding enable instruction or message:
        providing the address with the message forwarding enable message for use by the equipment in registering with the address.

30. The method of claim 26, further comprising:
    in response to the receiving of the user input comprising the message forwarding enable instruction or message:
        providing the address and the alternate address in association with the message forwarding disable message for the equipment.

31. The method of claim 26, wherein the first address is a Mobile Station International ISDN (MSISDN).

32. The method of claim 26, wherein the short message comprises one of a Short Message Service (SMS) message and a Multimedia Messaging Service (MMS) message.

33. The method of claim 26, which is embodied in a computer program product comprising a computer readable medium and computer instructions stored in the computer readable medium, where the computer instructions are executable by one or more processors of the mobile communication device to perform the acts of the method.

34. A mobile communication device which is configured to control a forwarding of short messages in a wireless communication network, the mobile communication device comprising:
    a wireless transceiver;
    one or more processors coupled to the user interface and the wireless transceiver;
    the one or more processors being configured to:
        receive, via a user interface, a user input comprising a message forwarding enable instruction or message;
        in response to the receiving of the user input comprising the message forwarding enable instruction or message: cause a message forwarding enable message to be sent to equipment in the wireless communication network through the wireless transceiver, the message forwarding enable message being defined to cause the equipment to register its location in the wireless communication network with respect to an address associated with the mobile communication device, for receipt and forwarding of short messages addressed to the address to an alternate address which identifies an alternate communication device;
        receive, via the user interface, a user input comprising a message forwarding disable instruction or message; and
        in response to the receiving of the message forwarding disable instruction or message: cause a message forwarding disable message to be sent to the equipment in the wireless communication network through the wireless transceiver, the message forwarding disable message being defined to cause the equipment to deregister its location from the wireless communication network with respect to the address.

35. The mobile communication device of claim 34 wherein the one or more processors are further configured to, in response to the receiving of the user input comprising the message forwarding disable instruction or message, register a location of the mobile communication device in the wireless communication network with respect to the first address.

36. The mobile communication device of claim 34, wherein the one or more processors are further configured to, in response to the receiving of the user input comprising the message forwarding enable instruction or message, deregister a location of the mobile communication device from the wireless communication network with respect to the address.

37. The mobile communication device of claim 34, wherein the one or more processors are further configured to, in response to the receiving of the user input comprising the message forwarding enable instruction or message, provide the address with the message forwarding enable message for use by the equipment in registering with the address.

38. The mobile communication device of claim 34, wherein the one or more processors are further configured to, in response to the receiving of the user input comprising the message forwarding enable instruction or message, provide the address and the alternate address in association with the message forwarding disable message for the equipment.

39. The mobile communication device of claim 34, wherein the address is a Mobile Station International ISDN (MSISDN).

40. The mobile communication device of claim 34, wherein the short message comprises one of a Short Message Service (SMS) message and a Multimedia Messaging Service (MMS) message.

* * * * *